(12) United States Patent  (10) Patent No.: US 8,744,143 B2
Chen  (45) Date of Patent: Jun. 3, 2014

(54) ADDING PRIVACY PROTECTION TO PHOTO UPLOADING/ TAGGING IN SOCIAL NETWORKS

(75) Inventor: Pei-Hsi Chen, Taichung (TW)

(73) Assignee: Yahoo! Inc., Sunnyvale, CA (US)

( * ) Notice: Subject to any disclaimer, the term of this patent is extended or adjusted under 35 U.S.C. 154(b) by 314 days.

(21) Appl. No.: 13/077,998

(22) Filed: Apr. 1, 2011

(65) Prior Publication Data

US 2012/0250951 A1  Oct. 4, 2012

(51) Int. Cl.
*G06K 9/54* (2006.01)
*H04N 7/18* (2006.01)

(52) U.S. Cl.
USPC .......................... 382/118; 382/305; 348/143

(58) Field of Classification Search
USPC ......... 382/100, 115, 118, 276, 305, 312, 321, 382/293, 294; 348/207.99, 207.1, 222.1, 348/231.3, 61, 143, 157, 231.5, 152, 153, 348/159, 169, 231.2, 231.7, 231.9, 211.1, 348/211.3; 709/204, 217, 21.9; 715/205, 715/200; 707/E17.019, 758, 769, E17.026, 707/E17.014; 386/E5.043, E5.002; 455/412.1, 466, 445, 413, 414.1
See application file for complete search history.

(56) References Cited

U.S. PATENT DOCUMENTS

| | | | |
|---|---|---|---|
| 8,073,866 B2 * | 12/2011 | Eagle et al. | 707/770 |
| 8,385,971 B2 * | 2/2013 | Rhoads et al. | 455/556.1 |
| 8,407,093 B2 * | 3/2013 | Cartmell | 705/14.64 |
| 2006/0238380 A1 * | 10/2006 | Kimchi et al. | 340/995.1 |
| 2007/0150340 A1 * | 6/2007 | Cartmell | 705/14 |
| 2011/0202968 A1 * | 8/2011 | Nurmi | 726/1 |
| 2012/0075464 A1 * | 3/2012 | Derenne et al. | 348/135 |

* cited by examiner

*Primary Examiner* — Sheela Chawan
(74) *Attorney, Agent, or Firm* — James J. DeCarlo; Greenberg Traurig, LLP (57) ABSTRACT

An individual is identified in a photograph. A portion of the photograph is temporarily blurred to prevent the individual from being recognized. Once consent is received for the tag, the blur is removed. However, if consent is not received, the blur remains.

18 Claims, 7 Drawing Sheets

ADDING PRIVACY PROTECTION TO PHOTO UPLOADING/TAGGING IN SOCIAL NETWORKS

BACKGROUND

1. Technical Field

Embodiments of the invention relate generally to online photograph sharing, and more specifically, privacy options for photograph uploads and tagging of an individual.

2. Prior Art

The rise of social networks has led to more and more personal information being published online. In one case, photographs are uploaded by users for sharing with friends within the social network. The photograph can be tagged with a friend's name, and, in turn, viewed by other users of the social network.

Unfortunately, a photograph can be uploaded and tagged without authorization from subjects of the photograph. This can cause embarrassing or otherwise inappropriate pictures to be displayed. For example, a picture of a business executive in a swimming suit may not be appropriate for friends of the executive that are clients. In some cases, the tagged photograph is tagged and viewed by friends before the subject has time to request that it be removed. Sometimes, the photograph cannot be removed.

In the light of the foregoing discussion, there is a need for a consent-based technique for ensuring privacy for online photographs.

SUMMARY

The above-mentioned needs are met by a method, computer program product and system for consent-based sharing of online photographs.

In one embodiment, an individual is identified in a photograph. A portion of the photograph is temporarily blurred to prevent the individual from being recognized. Once consent is received for the tag, the blur is removed. However, if consent is not received, the blur remains.

In another embodiment, a facial detection technique automatically identifies and blurs faces of, for example, friends in a social network until consent is received. Optionally, training photographs can be uploaded.

Advantageously, a user's privacy can be maintained until, and only if, consent is given.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

The above-mentioned needs are met by a method, computer program product and system for consent-based sharing of online photographs. For example, individuals tagged in online photographs can be blurred until permission is obtained for publication. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
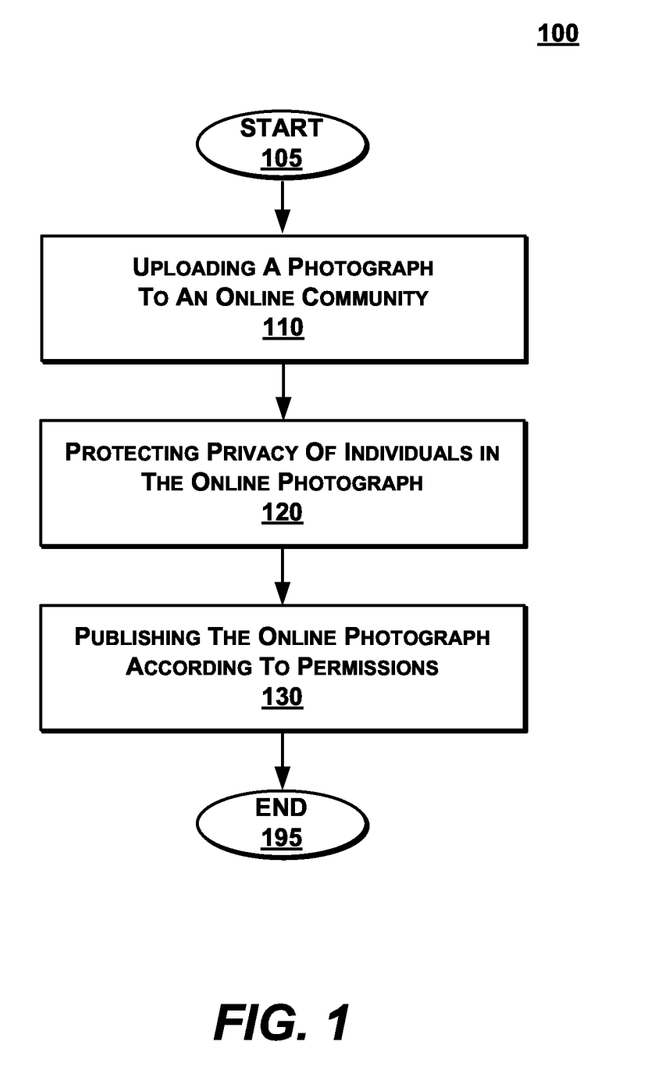
FIG. 1 is a flow chart illustrating a method for consent-based sharing of online photographs according to an embodiment.

FIG. 1 is a flow chart illustrating a method 100 for consent-based sharing of online photographs according to an embodiment.

At step 110, a photograph is uploaded to an online community. The online community can be of any type. Social networks such as Facebook, Yahoo! Pulse, Twitter or LinkedIn connect friends or contacts online for sharing personal and business information. For example, an individual can become friends with high school classmates and follow daily occurrences through status posts. In other embodiments, photographs are uploaded via other online or sharing such as instant messenger, e-mail, blogs, web pages, or the like.

The photograph comprises a portrait of individuals recognizable by face or otherwise. In some embodiments, the photograph can also be a cartoon character, a pet, a building or any other type of identifiable object. Various formats can be used such as GIF, JPEG, PNG, or other compressed or uncompressed formats, or any other suitable format. Many different types of photographs are uploaded. A classmate may upload a picture from 10 years ago at a pep rally, or a picture from yesterday at a 10-year class reunion.

The photograph can be uploaded using various techniques. For example, a web interface can allow a user to identify locally-stored or online photographs. A user may be asked whether they have permission to upload and publish.

At step 120, the privacy of individuals in the online photographs is protected, as described below with respect to FIGS. 2 and 3. In one embodiment, individuals in the photograph are blurred until permission is obtained. The individuals can be explicitly identified by tagging or implicitly identified by facial detection techniques.

At step 130, an online photograph is published in accordance with permissions granted. In one embodiment, if permissions have yet to be obtained, or if permission has been denied, the photograph is published with one or more individuals blurred. If all permissions have been obtained, the photograph appears without blurring. In one embodiment, the photograph is published, for example, in a news feed, gallery, or a profile page, so that other friends or the public can view or download. The photograph may be listed in search engines such as Yahoo! Image Search of Google Images. As a result, when an individual's name is queried, the photograph may be listed in the search results. Within a social network, the photograph can have permissions allowing various levels of access (e.g., friends, friends of friends, all members, etc.). In some embodiments, are automatically displayed in a news feed of friends.

In an alternative embodiment, individuals in an online video are identified and blurred. When permission is received, the individuals are unblurred.

Figure 2:
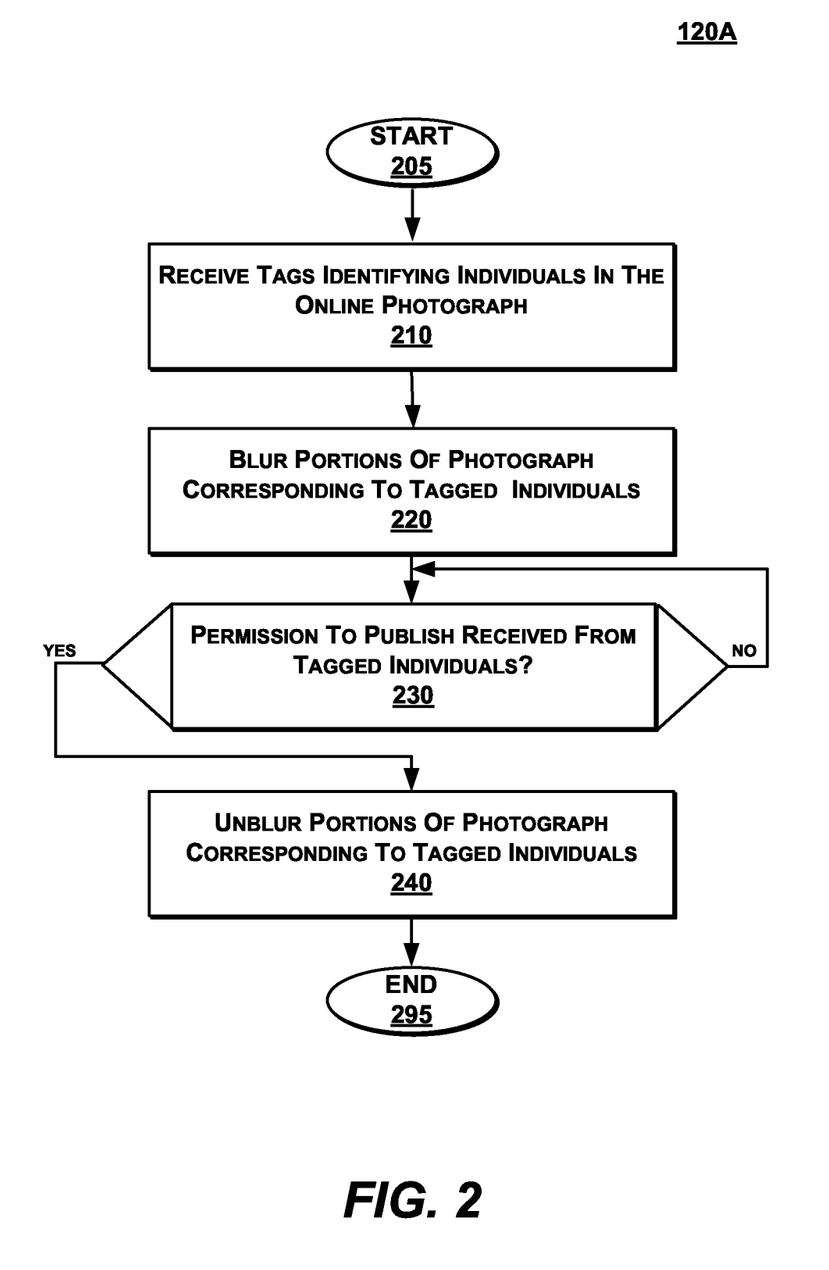
FIG. 2 is a flow chart illustrating a method for protecting the privacy of individuals in online photographs according to an embodiment.

FIG. 2 is a flow chart illustrating a method 120A for protecting the privacy of individuals in online photographs according to an embodiment.

At step 210 tags identifying individuals in online photographs are received. Generally, a tag identifies an individual or object in a photograph. A user can be queried about tagging when uploading a picture, or a user can select a tag function for an existing one. When tagging, a user uses a cursor or other selector to select a portion of a picture (e.g., an individual pixel or a boxed area) and associates a friend, contact, or name with the selection. Subsequently, when the picture is viewed, a text box showing a name is displayed near the tag location.

At step 220, portions of the photograph corresponding to tagged individuals are blurred. The portion can be, for example, a single pixel, a square, a rectangle, an elliptical or any other selected area. In one embodiment, the selected portion is blurred. In another embodiment, an entire face or body associated with a tag are blurred.

Blurring, in general, is an image processing technique that reduces sharpness of an image. A blurred image can be similar to viewing the image through a translucent screen. In one example, a Guassian blur function is used. Other image distortion techniques that prevent an individual from being identified, such as occlusions, can be used as well.

In step 230, if permission to publish is received, a blurred portion of the photograph is unblurred in step 240. Permission can be obtained, for example, by sending a message to a tagged individual. The message can include a copy of the picture along with a YES button and a NO button to input a decision. The message can be sent to an inbox of a social network or to an associated e-mail account.

If permission is not received, the blurred portion remains blurred in one embodiment. In another embodiment, the blur expires if an express decision is not received. Many other variations can be implemented.

Figure 3:
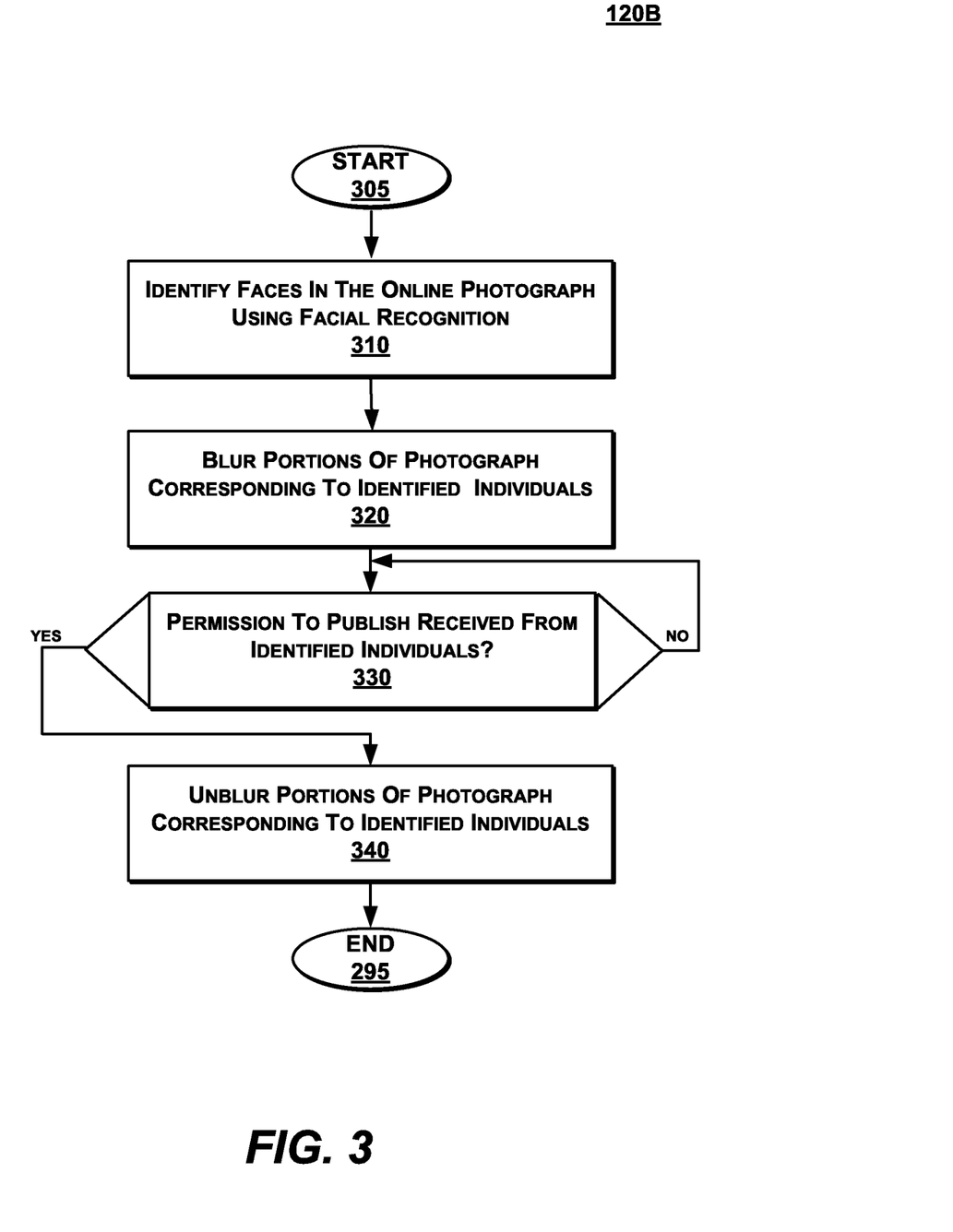
FIG. 3 is a flow chart illustrating a method for protecting the privacy of individuals in online photographs according to another embodiment.

FIG. 3 is a flow chart illustrating a method 120B for protecting the privacy of individuals in online photographs according to another embodiment.

The method 120B can be similar to the method 120A, except that individuals in a photograph are not explicitly tagged. Instead, in step 310, faces are implicitly identified using facial recognition. In one embodiment, landmarks or nodal points common to human faces are detected (e.g., eye pupils). Using this technique, individuals can be automatically blurred in photographs, even if they are not tagged, as described above.

In one embodiment, photographs of individuals can be uploaded to a training database for facial recognition. In another embodiment, training photographs can be taken from profile pictures of friends or other tags.

Figure 4:
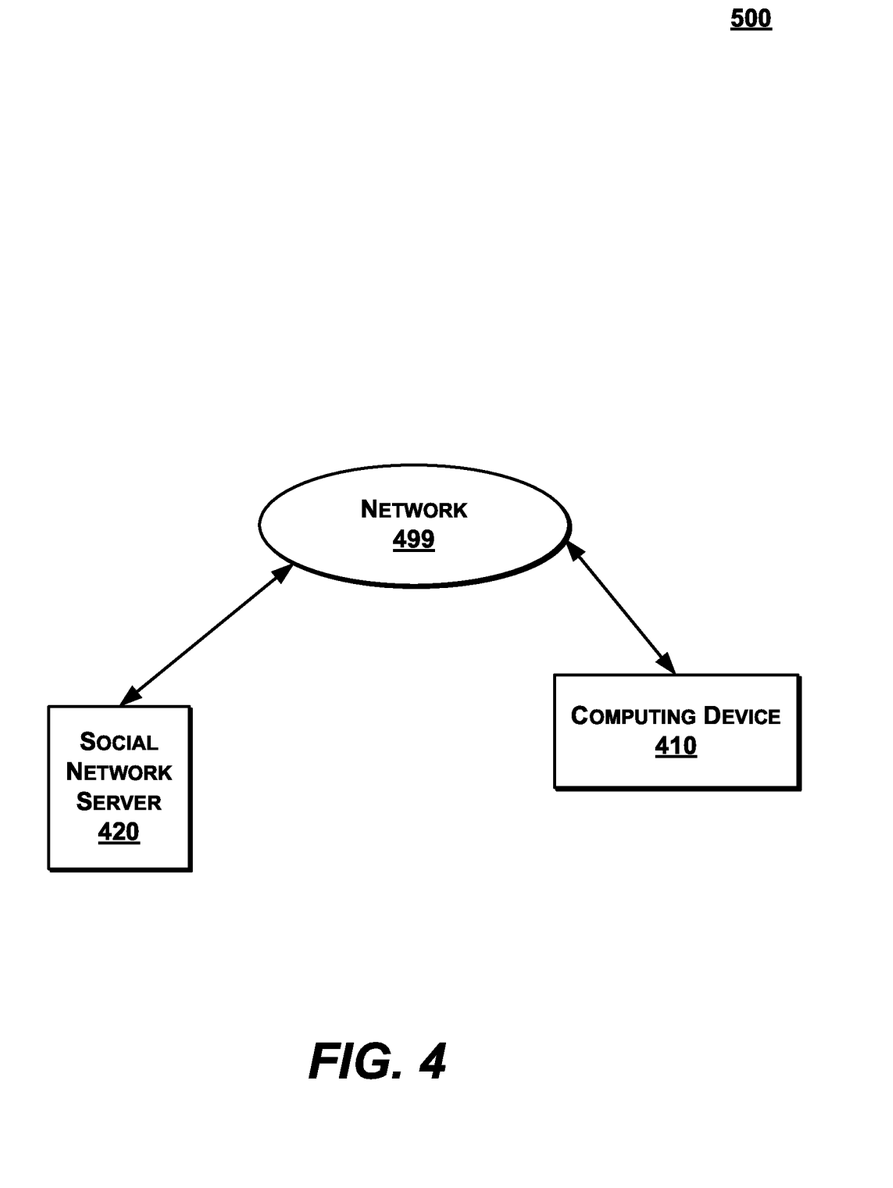
FIG. 4 is a block diagram illustrating a system for consent-based sharing of online photographs according to an embodiment.

FIG. 4 is a block diagram illustrating a system 400 for consent-based sharing of online photographs according to an embodiment.

The system 400 includes a computing device 410 and a social network server 420, coupled in communication through a network 499 (e.g., the Internet, a LAN, a WAN, a cellular network or any combination).

The computing device 410 can be, for example, a PC, a stationary computing device, a laptop or notebook computer, a tablet computer, a smart phone or PDA, a smart appliance, a video gaming console, an Internet television, a set-top box, or any other suitable processor-based device that can send view advertisements. There can be numerous computing devices 410 used by different users. In one embodiment, the computing device 410 provides user access to an online account. Additional embodiments of the computing device 410 are described in more detail below.

The social network server 420 can be one or more of any of the above processing-based devices. In one embodiment, the social network server 420 hosts a social networking web site such as Yahoo! Pulse, Facebook or Twitter.

Figure 5:
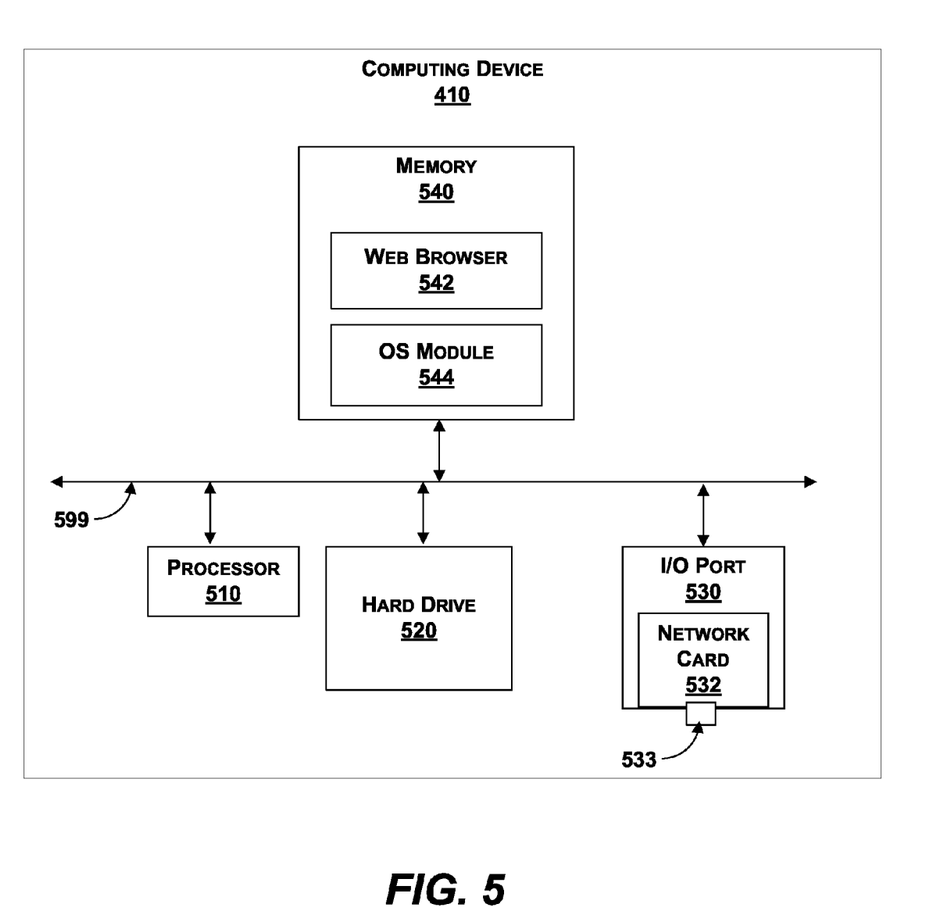
FIG. 5 is a block diagram illustrating a computing device according to an embodiment.

FIG. 5 is a block diagram illustrating a computing device 410 according to an embodiment.

The computing device 410 includes a processor 510, a hard drive 520, an I/O port 530, and a memory 540 coupled by a bus 599.

The bus 599 can be soldered to one or more motherboards. The processor 510 can be a general purpose processor, an application-specific integrated circuit (ASIC), an FPGA (Field Programmable Gate Array), a RISC (Reduced Instruction Set Controller) processor, an integrated circuit, or the like. There can be a single core, multiple cores, or more than one processor. In one embodiment, the processor 510 is specially suited for the processing demands of photograph sharing (e.g., custom micro-code, instruction fetching, pipelining or cache sizes). The processor 510 can be disposed on silicon or any other suitable material. In operation, the processor 510 can receive and execute instructions and data stored in the memory 540 or the hard drive 520. The hard drive 520 can be a platter-based storage device, a flash drive, an external drive, a persistent memory device, or any other type of memory.

The hard drive 520 provides persistent (i.e., long term) storage for instructions and data. The I/O port 520 is an input/output panel including a network card 522. The network card 522 can be, for example, a wired networking card (e.g., a USB card, or an IEEE 802.3 card), a wireless networking card (e.g., an IEEE 802.11 card, or a Bluetooth card), a cellular networking card (e.g., a 3G card). An interface 523 is configured according to networking compatibility. For example, a wired networking card includes a physical port to plug in a cord, and a wireless networking card includes an antennae. The network card 522 provides access to a communication channel on a network.

The memory 540 can be a RAM (Random Access Memory), a flash memory, a non-persistent memory device, or any other device capable of storing program instructions being executed. The memory 540 further comprises a web browser 542, and an OS (operating system) module 544. The OS module 544 can be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

The web browser 542 can be a desktop web browser (e.g., Internet Explorer, Mozilla, or Chrome), a mobile browser, or a web viewer built integrated into an application program. In an embodiment, a user accesses a system on the World Wide Web (WWW) through a network such as the Internet. The web browser 542 is used to download web pages or other content in various formats including HTML, XML, text, PDF, and postscript, and may be used to upload information to other parts of the system. The web browser 642 may use URLs to identify resources on the web and HTTP (HyperText Transfer Protocol) in transferring files on the web. In one embodiment, the web browser 542 provides a user interface for photograph sharing.

Figure 6:
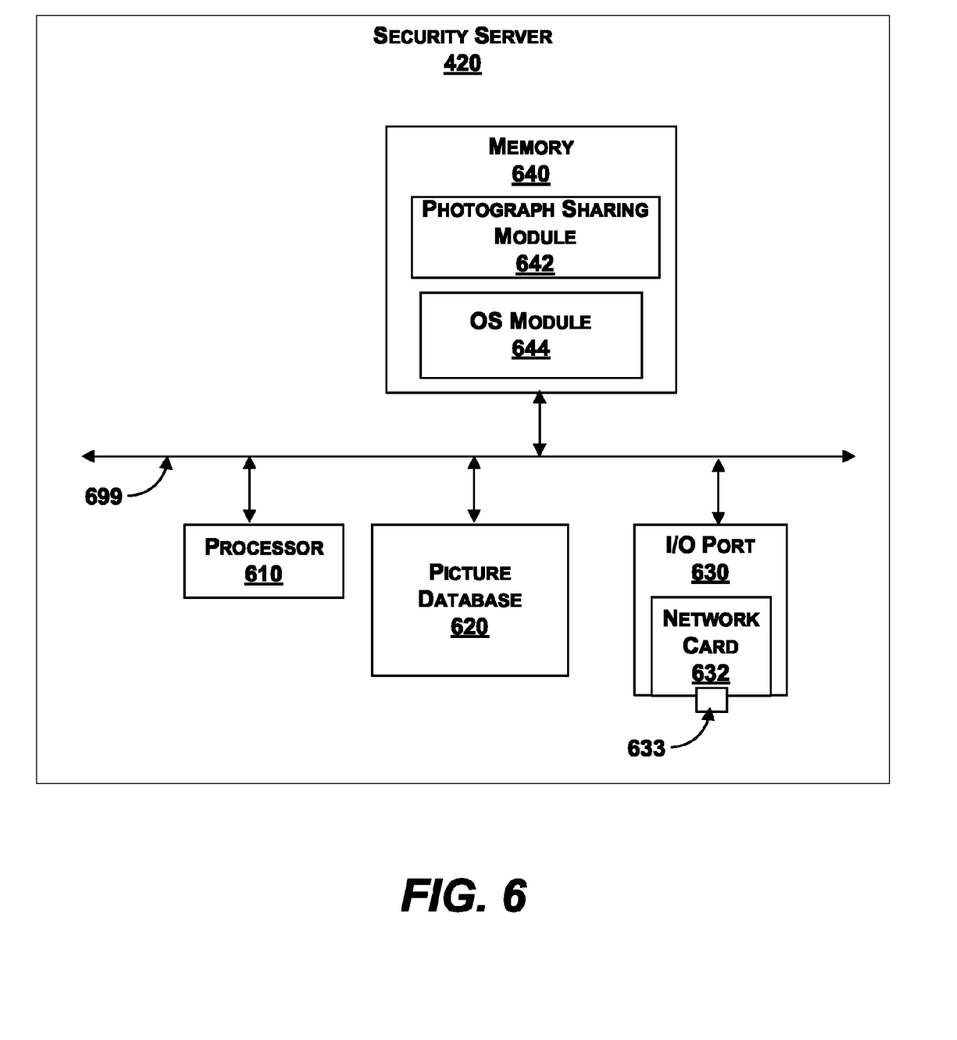
FIG. 6 is a block diagram illustrating a social networking server according to an embodiment.

FIG. 6 is a block diagram illustrating a social networking server 420 according to an embodiment. The social networking server 420 includes a processor 610, a picture database 620, an I/O port 630, and a memory 640, coupled by a bus 699. The processor 610, a hard drive 620, and the I/O port 630 can be configured as described above with respect to FIG. 5.

The memory 640 comprises an OS module 644, as described above, along with a photograph sharing module 642. The photograph sharing module 642, in one embodiment, publishes photographs selected by a user. The photograph sharing module 642 is described in more detail below.

Figure 7:
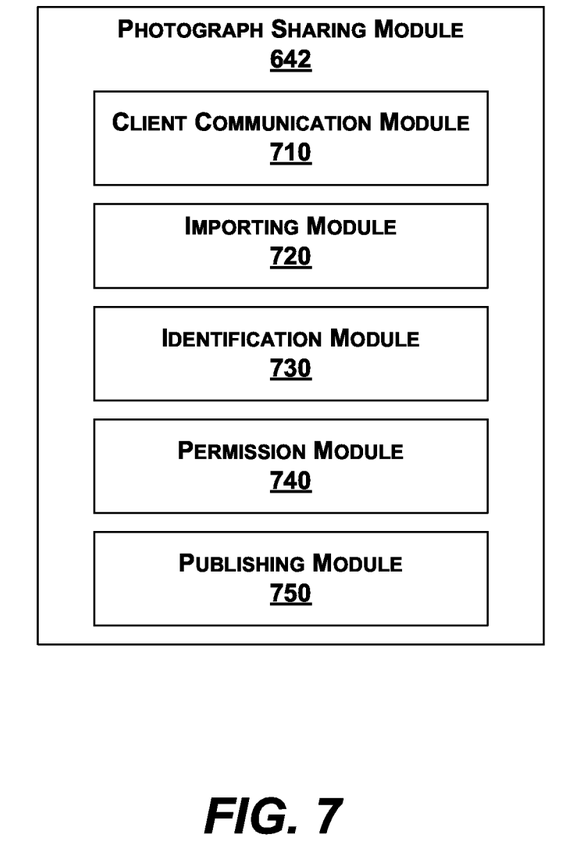
FIG. 7 is a block diagram illustrating a photograph sharing module according to an embodiment.

FIG. 7 is a block diagram illustrating a photograph sharing module 642 according to an embodiment. The photograph sharing module 642 includes a client communication module 710, an importing module 720, an identification module 730, a permission module 740, and a publishing module 750. The components can communicate with each other through, for example, APIs (Application Programming Interfaces). In other embodiments, all or parts of the components can be implemented in hardware or benefit from special hardware accelerators.

In one embodiment, the client communication module 710 sends and receives information from the computing device 410 of FIG. 4 using APIs transported within network packets. The importing module 720 allows users to upload or select an online picture. The identification module 730 can allow a user to tag a picture. In another embodiment, the identification module 730 uses facial detection to identify individuals in a picture. The permission module 740 obtains consent to publish a picture. The publishing module 750 displays a picture, for example, in a newsfeed or a blog.

As described herein, computer software products may be written in any of various suitable programming languages, such as C, C++, C#, Pascal, Fortran, Perl, Matlab (from MathWorks), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). Many of the functionalities described herein can be implemented in computer software, computer hardware, or a combination.

Furthermore, the computer that is running the previously mentioned computer software may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A computer-implemented method for consent-based sharing online photographs, comprising:
  identifying the identity of an individual who is shown in the online photograph such that the individual's identity is ascertainable from viewing the photograph;
  blurring a portion of the online photograph so as to obscure the identity of the individual;
  responsive to receiving permission from the individual in response to a permission query message sent from another party wishing to view the unblurred online photograph to the individual based on the individual's identified identity, unblurring the portion of the online photograph to the other party wishing to view the unblurred online photograph.

2. The method of claim 1, further comprising:
  receiving an upload of the online photograph.

3. The method of claim 1, wherein identifying the individual comprises:
  receiving a tag on the online photograph corresponding to the individual.

4. The method of claim 1, wherein identifying the individual comprises:
   using facial recognition to identify the individual.

5. The method of claim 1, further comprising:
   receiving a training photograph of the individual prior to identifying the individual.

6. The method of claim 1, wherein blurring the photograph occurs prior to publishing the photograph online.

7. A computer program product stored on a non-transitory computer-readable medium that when executed by a processor, performs a method for consent-based sharing online photographs, comprising:
   identifying the identity of an individual who is shown in the online photograph such that the individual's identity is ascertainable from viewing the photograph;
   blurring a portion of the online photograph so as to obscure the identity of the individual;
   responsive to receiving permission from the individual in response to a permission query message sent from another party wishing to view the unblurred online photograph to the individual based on the individual's identified identity, unblurring the portion of the online photograph to the other party wishing to view the unblurred online photograph.

8. The computer program product of claim 7, further comprising:
   receiving an upload of the online photograph.

9. The computer program product of claim 7, wherein identifying the individual comprises:
   receiving a tag on the online photograph corresponding to the individual.

10. The computer program product of claim 7, wherein identifying the individual comprises:
    using facial recognition to identify the individual.

11. The computer program product of claim 7, further comprising:
    receiving a training photograph of the individual prior to identifying the individual.

12. The computer program product of claim 7, wherein blurring the photograph occurs prior to publishing the photograph online.

13. A computer system for consent-based sharing online photographs implemented at least partly in hardware, comprising:
    an identification module to identify the identity of an individual who is shown in the online photograph such that the individual's identity is ascertainable from viewing the photograph;
    an image processing module, coupled in communication to the identification module, the image processing module to blur a portion of the online photograph so as to obscure the identity of the individual; and
    a permission module, coupled to the image processing module, the permission module, responsive to receiving permission from the individual in response to a permission query message sent from another party wishing to view the unblurred online photograph to the individual based on the individual's identified identity, to unblur the portion of the online photograph to the other party wishing to view the unblurred online photograph.

14. The system of claim 13, further comprising:
    an importing module, coupled to the identification module, the importing module to an upload of the online photograph.

15. The system of claim 13, wherein the identifying module receives a tag on the online photograph corresponding to the individual.

16. The system of claim 13, wherein the identifying module uses facial recognition to identify the individual.

17. The system of claim 13, wherein the identification module receives a training photograph of the individual prior to identifying the individual.

18. The system of claim 13, wherein the image processing module blurs the photograph prior to publishing the photograph online.

* * * * *